Patented May 27, 1924.

1,495,260

UNITED STATES PATENT OFFICE.

PREVOST HUBBARD, CHARLES S. REEVE, AND RICHARD H. LEWIS, OF WASHINGTON, DISTRICT OF COLUMBIA.

PROCESS OF PREPARING A WATERPROOF PAVING OR ROAD MATERIAL.

No Drawing. Application filed April 21, 1916. Serial No. 92,731.

(FILED UNDER THE ACT OF MARCH 3, 1883, 22 STAT. L., 625.)

*To all whom it may concern:*

Be it known that we, PREVOST HUBBARD, CHARLES S. REEVE, and RICHARD H. LEWIS, citizens of the United States, and employees of the Department of Agriculture of the United States of America, residing in the city of Washington, District of Columbia, (whose post-office address is Washington, D. C.), have invented a new and useful Process of Preparing a Waterproof Paving or Road Material.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon.

Our invention relates to a new and useful process of incorporating ordinary soil, clay bearing sand, or clay with bituminous material by means of the use of water without previous heating of the soil material. We are aware of the fact that mixtures of soil and bituminous materials, such as asphalt, asphalt cement and heavy, refined tar have been previously made and used, but in all such processes the soil material is dried and heated before the bituminous material can be satisfactorily incorporated with it, while in others the soil material is pulverized. Our process obviates the heating as well as the pulverizing operations, thereby eliminating the expense and difficulties encountered in heating or pulverizing the soil material. This result, which is of especial advantage, is accomplished by working the soil material employed in our process into a soft mud with water, previous to the addition of the bituminous material. It will, therefore, be apparent from the foregoing and the following description that our process possesses distinct features of economy and efficiency over the methods of the type mentioned, in that it eliminates the equipment, labor, and time necessarily required for pulverizing and drying the soil material.

In practicing our process, we take any ordinary soil, clay bearing sand, or clay, and place it in a mechanical mixer of any well known type, and mechanically mix said material with sufficient water to form a soft mud or paste. The amount of water required will depend upon the amount already present in the soil material employed and may amount to as much as thirty per cent, by weight, of the soil material. When a uniform paste has been formed by this mixing, we then add to the mixture from ten to fifteen per cent of bituminous material, based on the weight of the soil used, which said bituminous material we pour in a hot fluid state over the wet, soft mud paste mixture in the mechanical mixer, and incorporate the bituminous material thoroughly and uniformly with the mud paste mixture by proper agitation. Upon completion of this operation, the bituminous mixture or mud is then adaptable for use and may be spread in a layer of proper thickness over a suitable foundation, or it may be molded into blocks by well known means and used in either way as a water proof paving or road material. From tests we find that the water rapidly evaporates from the final product, and the resultant material acquires a permanent set, forming a hard, well-coated, well-bound paving material, which is impervious to water. The consistency of the bituminous material used will depend, as in sheet asphalt construction, upon the locality in which the pavement is to be used, but we use materials of such consistency that they cannot otherwise be mixed with soil, clay bearing sand, or clay, unless such soil material is first dried and heated. Such bituminous material is, in general, one that does not readily flow at ordinary temperatures. The amount of bituminous material necessary for a thorough coating of the soil material particles will depend upon the mechanical analysis of the soil material, and we, therefore, do not limit these to the proportions named. In practice, we have discovered that the use of water assists in a thorough coating of the soil particles, and after this object is accomplished its presence is unnecessary.

Having thus described our invention, we claim:

1. A process of preparing a water-proof paving or road material consisting in mechanically mixing, through the aid of water, non-pulverized argillaceous material with more than 10 per cent and less than 14 per cent of heated semi-solid bitumen until said materials are thoroughly incorporated, without subjecting the argillaceous material to previous dehydrating and heating.

2. A process of preparing a water-proof paving or road material in which water is mixed with non-pulverized argillaceous material until the mixture is reduced to a pasty consistency and then mechanically mixing said mixture with more than 10 per cent and less than 14 per cent of heated semi-solid bitumen until the components of the mixture are thoroughly incorporated with one another.

3. A process of preparing a water-proof paving or road material in which non-pulverized argillaceous material in the form of a paste containing not more than 30 per cent water is mechanically mixed with more than 10 per cent and less than 14 per cent of heated semi-solid bitumen until the components of the mixture are thoroughly incorporated with one another.

In testimony whereof, we affix our signatures in the presence of two subscribing witnesses.

PREVOST HUBBARD.
CHARLES S. REEVE.
RICHARD H. LEWIS.

Witnesses:
E. C. E. LORD,
F. P. PRITCHARD.